United States Patent [19]

Koumura

[11] Patent Number: 4,972,271
[45] Date of Patent: Nov. 20, 1990

[54] IMAGE RECORDING APPARATUS

[75] Inventor: Noboru Koumura, Narashino, Japan

[73] Assignee: Canon Kabushiki Kaisha, Tokyo, Japan

[21] Appl. No.: 105,974

[22] Filed: Oct. 6, 1987

Related U.S. Application Data

[63] Continuation of Ser. No. 710,601, Mar. 11, 1985, abandoned, which is a continuation of Ser. No. 447,990, Dec. 8, 1982, abandoned.

[30] Foreign Application Priority Data

Dec. 17, 1981 [JP] Japan .............................. 56-202402

[51] Int. Cl.$^5$ .................. H04N 1/23; H04N 1/29; G03G 21/00
[52] U.S. Cl. ............................. 358/300; 355/25; 355/202; 355/233
[58] Field of Search .................. 355/3 R, 3 SH, 14 R, 355/14 SH, 23, 24, 25, 26, 202, 203; 358/298, 300, 302; 346/75, 140

[56] References Cited

U.S. PATENT DOCUMENTS

| | | | |
|---|---|---|---|
| 3,597,071 | 7/1971 | Jones | 355/3 R |
| 3,615,129 | 10/1971 | Drawe et al. | 355/25 X |
| 3,723,645 | 3/1973 | Takami et al. | 178/6.6 A |
| 3,936,171 | 2/1976 | Brooke | 355/26 X |
| 3,976,982 | 9/1976 | Eiselen | 340/172.5 |
| 4,098,551 | 7/1978 | Komori et al. | 355/26 X |
| 4,149,145 | 4/1979 | Hartke | 340/739 |
| 4,196,450 | 4/1980 | Miller | 358/256 |
| 4,213,694 | 7/1980 | Kuseski | 355/26 |
| 4,214,276 | 7/1980 | Pugsley | 358/256 |
| 4,231,069 | 10/1980 | Wellendorf | 358/256 |
| 4,240,119 | 12/1980 | Norton | 358/297 |
| 4,247,192 | 1/1981 | Komori et al. | 355/1 |
| 4,264,808 | 4/1981 | Owens | 358/256 X |
| 4,278,344 | 7/1981 | Sahay | 355/23 X |
| 4,291,341 | 9/1981 | Yajima | 358/300 |
| 4,310,859 | 1/1982 | Takahashi et al. | 358/304 |
| 4,315,684 | 2/1982 | Sugiura et al. | 355/7 X |
| 4,316,665 | 2/1982 | Mochizuki et al. | 355/7 X |
| 4,326,222 | 4/1982 | Connin et al. | 358/292 |
| 4,350,431 | 9/1982 | Mochizuki et al. | 355/1 |
| 4,353,638 | 10/1982 | Knechtel | 355/8 |
| 4,368,975 | 1/1983 | Matsui et al. | 355/50 |
| 4,395,118 | 7/1983 | Komori et al. | 355/75 |
| 4,403,850 | 9/1983 | Masuda | 355/14 R |
| 4,417,805 | 11/1983 | Kishi | 355/14 R |
| 4,422,751 | 12/1983 | Komiyama et al. | 355/14 SH |
| 4,427,285 | 1/1984 | Stange | 355/3 FU |
| 4,439,036 | 3/1984 | Davis et al. | 355/75 |
| 4,455,081 | 6/1984 | Yoshimura et al. | 355/14 SH |
| 4,641,197 | 2/1987 | Miyagi | 358/280 |

FOREIGN PATENT DOCUMENTS

| | | |
|---|---|---|
| 1117178 | 1/1982 | Canada . |
| 2810435 | 9/1978 | Fed. Rep. of Germany . |
| 2933422 | 2/1980 | Fed. Rep. of Germany . |
| 3039503 | 4/1981 | Fed. Rep. of Germany . |
| 3142971 | 5/1982 | Fed. Rep. of Germany . |
| 1499412 | 2/1978 | United Kingdom . |
| 1531401 | 11/1978 | United Kingdom . |

Primary Examiner—Fred L. Braun
Attorney, Agent, or Firm—Fitzpatrick, Cella Harper & Scinto

[57] ABSTRACT

An image recording apparatus capable of recording images of two opened pages of a book-type original on the front and back sides either of one record paper or of different record papers upon receipt of a single instruction. Image data representing a first page of two opened pages of the book-type original read by a first reading unit is supplied to a recording unit, and representing image data of a second page of the original reading by a second read unit can also be stored in a memory. The recording unit record images based on the first image data and third image data which was read and stored in the memory in a previous cycle.

21 Claims, 10 Drawing Sheets

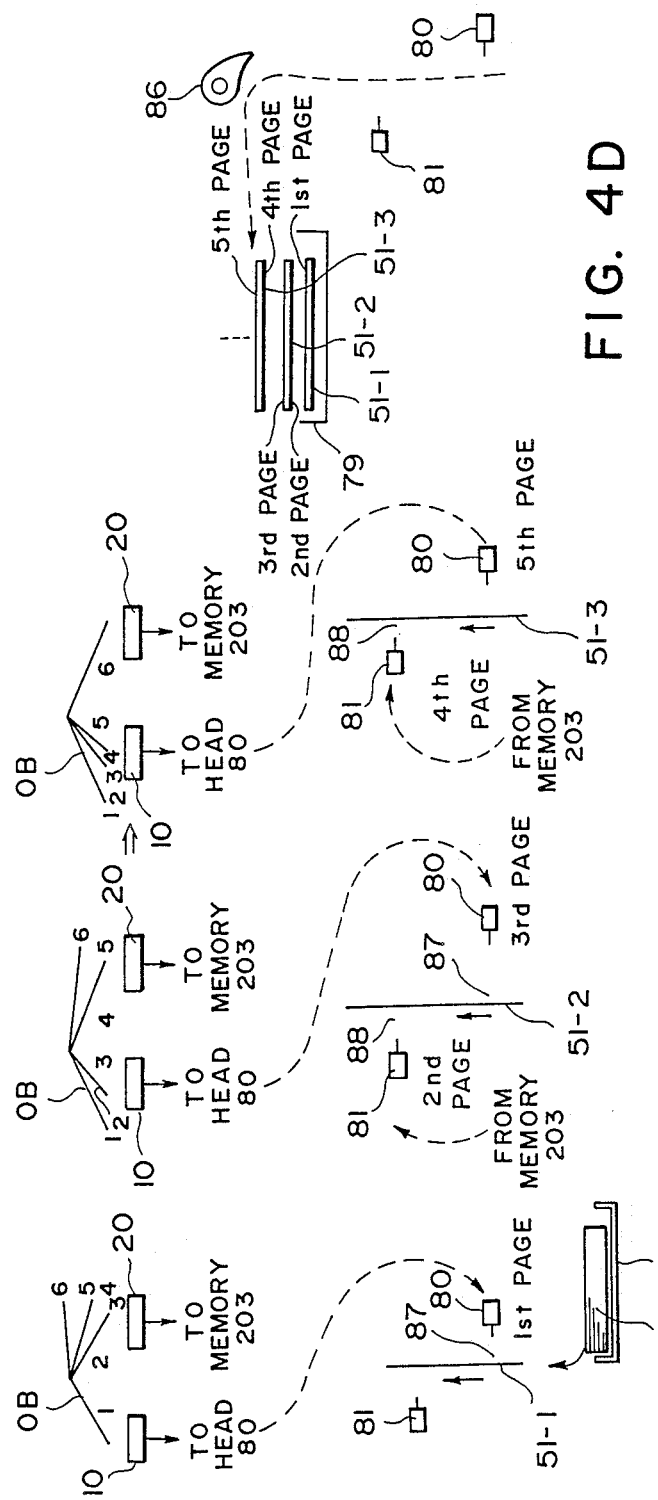

IMAGE RECORDING APPARATUS

This application is a continuation of application Ser. No. 710,601 filed Mar. 11, 1985, now abandoned, which is a continuation of Ser. No. 447,990 filed on Dec. 8, 1982, now abandoned.

BACKGROUND OF THE INVENTION

1. Field of the Invention

The present invention relates to an image recording apparatus for recording an image on a record medium such as a paper based on image information.

2. Description of the Prior Art

A recording apparatus for recording images on both sides of a record medium has been known. For example, in a copying machine of a well-known electrophotographic system, a first original image is copied on one side of a record medium, and then the record medium is inverted and fed again to a recording station to copy a second original image on the other side of the record paper [See, for example, U.S. Pat. No. 3,615,129 (U.S. Ser. No. 752,075)]. In such an apparatus, when double-side recording is to be effected for a book-type original, an image on a page to be copied must be manually moved to a predetermined mount position and the double-side recording takes a long time.

An apparatus which effects the double-side recording based on an image signal photo-electrically read from original images has been proposed by the present assignee (U.S. Ser. No. 354,601 filed Mar. 4, 1982, now U.S. Pat. No. 4,475,128. When double-side recording is to be effected by this apparatus for a book-type original, two opened pages of the book-type original are recorded on respective sides of a record paper. However, according to this double-side recording, the pages on opposite sides of the produced double-side record paper do not correspond to the pages on opposite sides of the book-type original and hence the booktype original is not exactly reproduced.

An apparatus which records a read image in real time on a record medium has been proposed. However, it may be preferable to record an image after it has been stored, depending on the number of copies, a condition of the apparatus or a content of the image data.

SUMMARY OF THE INVENTION

It is an object of the present invention to provide an image recording apparatus which records an image in a simple manner depending on an application.

It is another object of the present invention to provide an image recording apparatus which effects double-side recording for a book-type original without requiring manual intervention.

It is another object of the present invention to provide an image recording apparatus which exactly reproduces front and back pages of a book-type original on front and back page of a record paper.

It is another object of the present invention to provide an image recording apparatus having a multi-double-side recording mode, which collates pages of record media in accordance with an operation mode.

It is another object of the present invention to provide an image recording apparatus which can selects an image recording mode depending on an application of a user.

Those and other objects and features of the present invention will be apparent from the following description of the present invention.

BRIEF DESCRIPTION OF THE DRAWINGS

FIGS. 4A–4D show diagrams for illustrating a first recording mode of the present apparatus.

DETAILED DESCRIPTION OF THE PREFERRED EMBODIMENTS

Figure 1A:
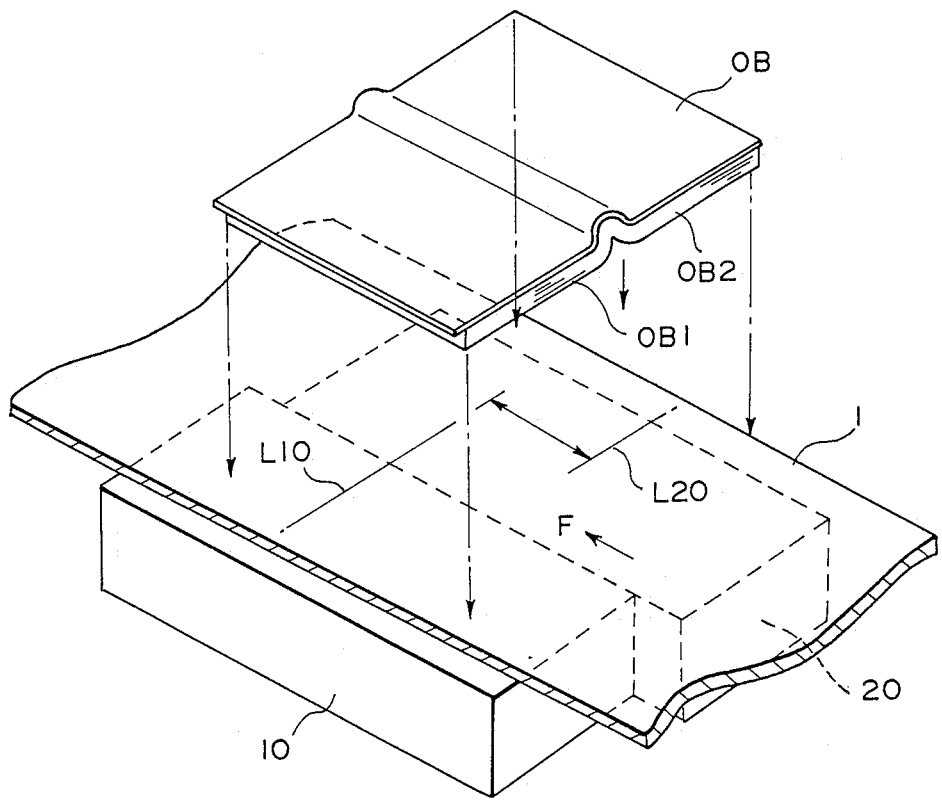
FIGS. 1A and 1B show a perspective view and an internal structure of a read unit of the apparatus of the present invention.
Figure 1B:
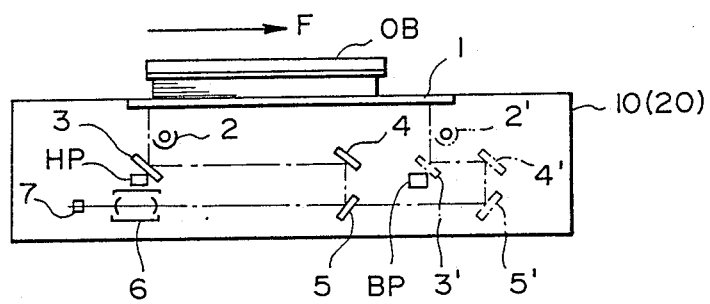

FIGS. 1A and 1B show one embodiment of a record unit of the double-side recording apparatus of the present invention. As shown in FIG. 1A, readers 10 and 20 are arranged under a glass 1 of a mounting plate for a book-type original OB, for reading opened pages OB1 and OB2, respectively, of the original OB. Optical systems of the readers 10 and 20 are of the same construction and they are moved in a direction of an arrow F while maintaining relative positions of original scan lines L10 and L20, to read the opened pages of the original OB in one cycle. FIG. 1B shows a structure of the original reading optical system of the reader 10 (or 20). Numeral 1 denotes a mounting glass, numeral 2 denotes a bar light source such as a halogen lamp or a fluorescent lamp, numeral 3 denotes a first mirror, numeral 4 denotes a second mirror, numeral 5 denotes a third mirror, numeral 6 denotes a lens, and numeral 7 denotes a one-dimension solid-state imaging element such as a charge-coupled device, or CCD. The operation of the reader 10 (or 20) is now explained. The original OB mounted on the mounting glass 1 is illuminated by the bar light source 2 and scanned (or sub-scanned) by the first mirror 3, the second mirror 4 and the third mirror 5. The light ray reflected by the mirrors 3, 4 and 5 passes through the lens 6 and reaches the CCD 7. A main scan direction of the CCD 7 is normal to the plane of the drawing.

The bar light source 2 and the first mirror 3 are assembled in union by a support member (not shown) and scan (or sub-scan) the original while they are moved on a guide rail (not shown) in the direction F. The second mirror 4 and the third mirror 5 are assembled in union by a support member (not shown) and are moved on a guide rail (not shown) at half the speed of the moving speed of the first mirror 3 in the same direction as the first mirror 3. The bar light source 2, the first mirror 3, the second mirror 4 and the third mirror 5 can be moved to positions (2', 3', 4' and 5') shown by broken lines, respectively, and a light path length from the mounting glass 1 to the lens 6 through the mirrors 3, 4 and 5 are always kept constant. Thus, if the signal is orderly read from the photo-sensitive elements of the CCD 7 during the subscan, a sequential signal for raster-scanned original can be produced.

A home position sensor HP and a back position sensor BP for detecting the position of the optical system are arranged in at least one of the readers 10 and 20. The home position sensor HP detects when the optical system is at a start position for the original scan and the optical position sensor BP detects when the optical system is at an end position of the original scan.

Figure 2:
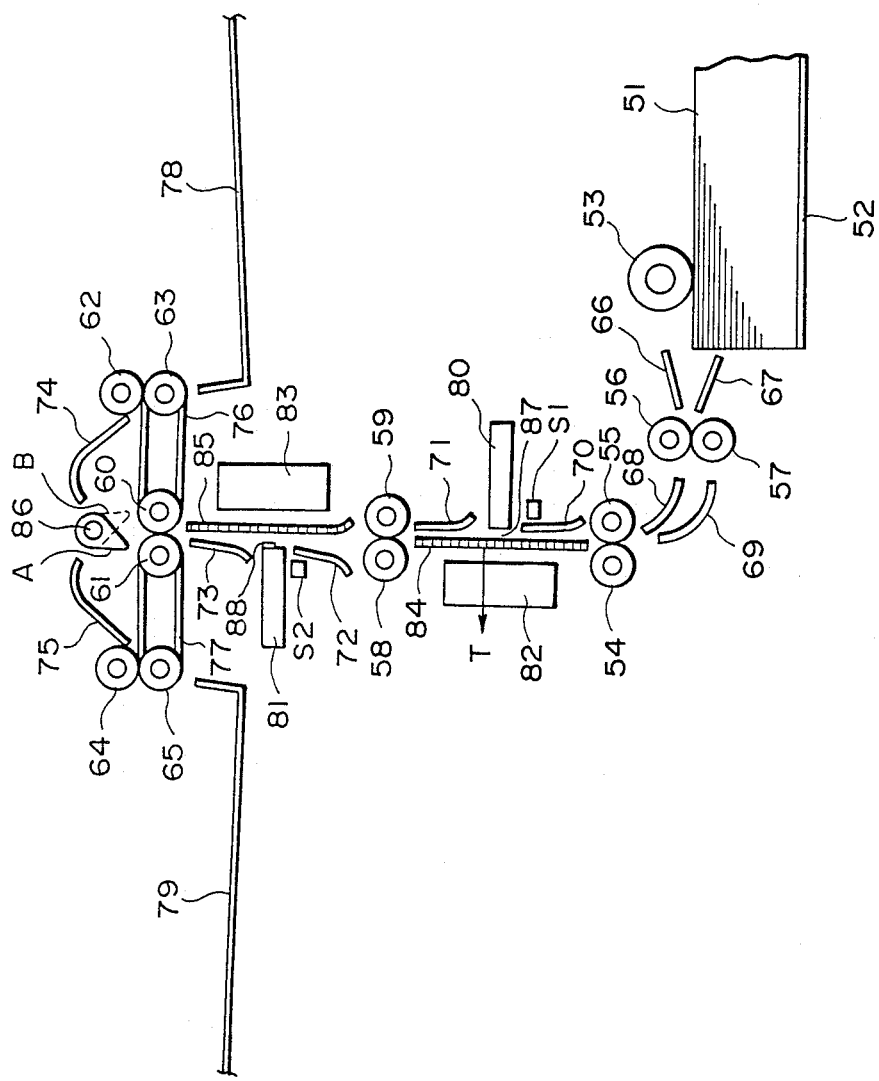
FIG. 2 shows an internal structure of a record unit of the present invention.

FIG. 2 shows an embodiment of a record unit for recording an image based on the image signal from the read unit. Numeral 51 denotes a record paper, numeral 52 denotes a record paper cassette which contains a plurality of record papers 51, numeral 53 denotes a paper feed roller for feeding the record paper 51, and numerals 54 and 55 denote registration rolls. Numerals 56, 57, 58, 59, 60, 61, 62, 63, 64 and 65 denote conveyer rollers for conveying the record paper 51, numerals 66, 67, 68, 69, 70, 71, 72, 73, 74 and 75 denote conveyer guides for smoothening the convey of the record paper 51 and numerals 76 and 77 denote conveyer belts for conveying the record paper 51. Numerals 78 and 79 denote first and second paper ejection trays for accommodating the recorded papers 51 and numerals 80 and 81 denote full-line ink jet heads each having a plurality of recording elements linearly arranged normally to the plane of the drawing across the width of the record paper 51. The reproduced image of the page OB1 of the original OB read by the reader 10 is recorded on a first page of the record paper 51 by the head 80, and the reproduced image of the page OB2 of the original OB read by the reader 20 is recorded on a second side of the record paper 51 by the head 81. Numerals 82 and 83 denote suction fans and numerals 84 and 85 denote porous guide plates. The suction fans 82 and 83 suck the record paper 51 to the guide plates 84 and 85 to maintain the planeness of the record paper 51 so that a spacing between the record paper 51 and the record head 80 or 81 is kept optimum. Numeral 86 denotes a convey path switching lever to switch the convey path to either the tray 78 or the tray 79. S1 and S2 denote a first paper sensor and a second paper sensor which detect that the record paper 51 has reached a point immediately in front of the record head 80 or 81.

The recording operation of the record unit is now explained. The record paper 51 contained in the paper cassette 52 is fed by the rotation of the paper feed roller 53 through the guides 66 and 67, the conveyer rollers 56 and 57 and the guides 68 and 69 in sequence to the stopped registration rollers 54 and 55 to form an appropriate loop. When the registration rollers 54 and 55 start to rotate at a predetermined timing, the record paper 51 is held between the registration rollers 54 and 55 and moved toward the ink jet head 80 by the rotation of the rollers 54 and 55. A guide plate 84 having slits and a fan 82 are arranged on the opposite side of the head 80 and air is flown by the rotation of the fan 82 in a direction T. Accordingly, the record paper 51 is moved toward the rollers 58 and 59 while it is sucked to the guide plate 84, and when it passes through a position 87, an image is recorded on the first side of the record paper 51 by the head 80.

In this manner, the record paper 51 has the image recorded on the first side and fed to a position 88 through the rollers 58 and 59 and the guidance by the guide 72 and the guide plate 85. At the position 88, an image is recorded on the second side of the record paper 51 by the head 81 and the record paper 51 is fed to the conveyer rollers 60 and 61 by the guidance of the guide 73 and the guide plate 85.

When the convey path switching lever 86 is in a solid line position A, the record paper 51 having the images recorded on both sides is guided rightward by the switching lever 86 and fed to the rollers 62 and 63 by the guide 74 and the conveyer belt 76 and then ejected to the first paper ejection tray 78 by those rollers. When the switching lever 86 is at a broken line position B, the record paper 51 is ejected to the second paper ejection tray 79.

Figure 3:
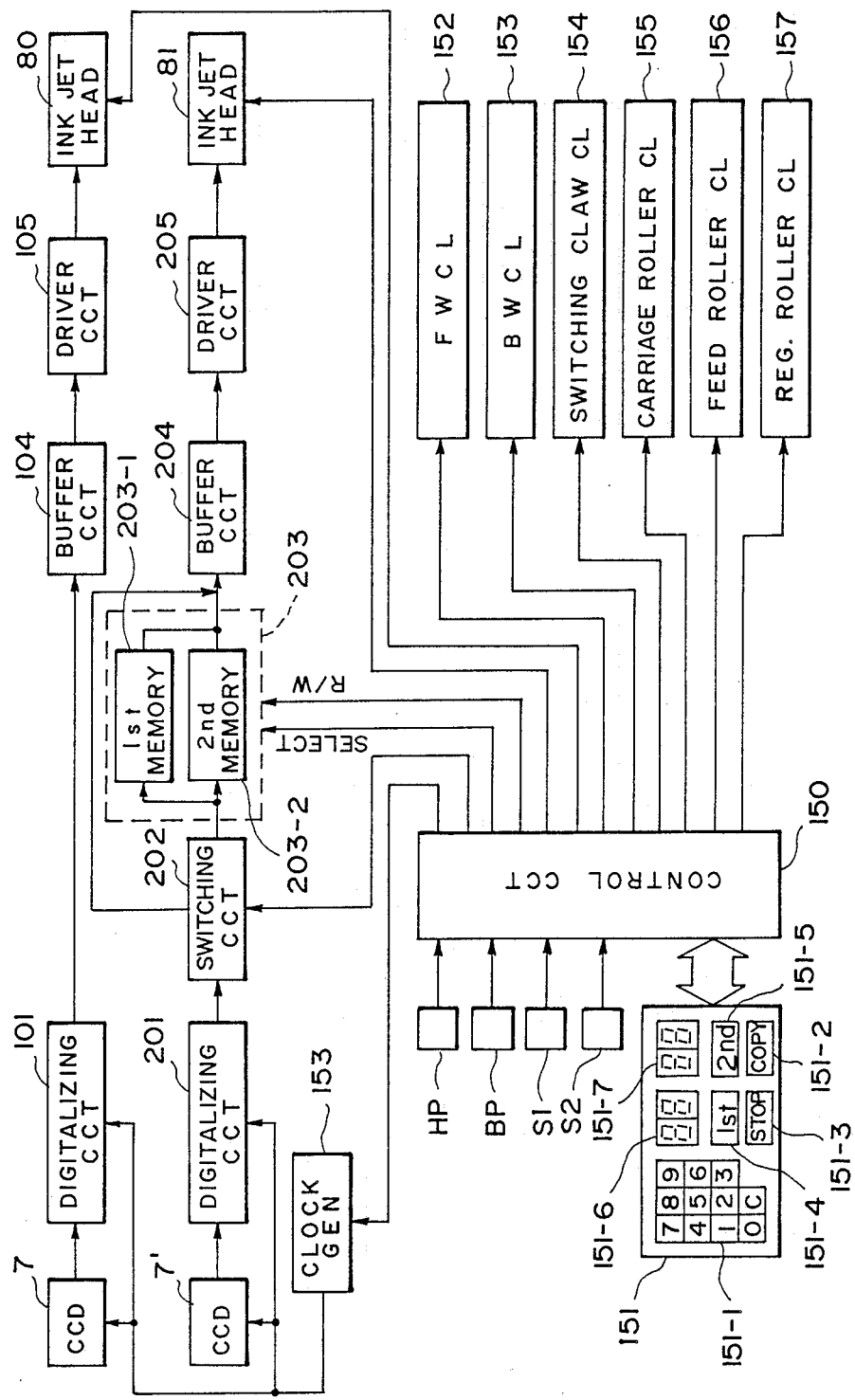
FIG. 3 shows a block diagram of a control unit of the present apparatus.

FIG. 3 shows an embodiment of a control unit for the units shown in FIGS. 1A, 1B and 2. Numerals 7 and 7' denote one-dimension solid-state imaging elements, for example CCD's in the readers 10 and 20, respectively, numerals 101 and 201 denote digitizing circuits for digitizing the image data read by the CCD's 7 and 7'. In the present embodiment, they are binary digitizing circuits. Numeral 202 denotes a switching circuit for selectively supplying the image data from the digitizing circuit 201 to a memory 203 or a buffer circuit 204. The memory 203 comprises a first memory 203-1 and a second memory 203-2 each having a sufficient capacity to store one page of information read from the opened page of the original OB. Numeral 104 denotes a buffer circuit which supplies the image data from the digitizing circuit 101 to a drive circuit 105. On the other hand, the buffer circuit 204 supplies the image data supplied directly from the digitizing circuit through the switching circuit 202 or the image data supplied from the memory 203, to a drive circuit 205. The drive circuits 105 and 205 drive the ink jet heads 80 and 81, respectively. Numeral 150 denotes a control circuit including a microcomputer (for example NEC $\mu$COM 43). It controls the operation of the apparatus in accordance with input signals and displays and controls key inputs from a console. Numeral 151 denotes a console arranged on a front side of the apparatus. Numeral 151-1 denotes a ten-key for inputting the number of copies and the number of pages of the original OB. Numeral 151-2 denotes a copy start key for instructing the start of copying. Numeral 151-3 denotes a stop key for stopping the copying operation. Numerals 151-4 and 151-5 denote mode selection keys for selecting recording modes. When the select key 151-4 is depressed, a first recording mode to be described later is selected, and when the select key 151-5 is depressed, a second recording mode to be described later is selected. When the select key is depressed, a lamp contained therein is lit. Numeral 151-6 denotes a page count indicator for indicating the number of pages of the original OB set by the ten-key 151-1. Numeral 151-7 denotes a copy count indicator for indicating the number of copies set by the ten-key 151-1.

HP and BP denote the home position sensor and the back position sensor, respectively, arranged in the read unit. S1 and S2 denotes the first and second paper sensors, respectively, arranged in the record unit. Numeral 152 denotes a forward clutch (FWCL) for transmitting a driving force to advance the optical system of the read unit. Numeral 153 denotes a backward clutch (BWCL) for transmitting a driving force to retract the optical system of the read unit Numeral 155 denotes a conveyer roller clutch for transmitting a rotation force to the conveyer rollers 56, 57, 58, 59, 60, 61, 62, 63, 64 and 65 of the record unit. Numeral 156 denotes a paper feed roller clutch for transmitting a driving force to drive the paper feed roller 53 for feeding out the record paper 51 from the paper cassette 52. Numeral 157 denotes a registration roller clutch for rotating the registration rollers 54 and 55 at a predetermined timing.

The control circuit 150 receives key information from the console 151 and the output signals from the sensors HP, BP, S1 and S2 to control the drive of the clutches 152–157 and also controls the image data processing to be described later.

The circuit 150 also controls the read and write of the image data from and to the memory 203 by a read/write signal (R/W) and a select signal (SELECT). It controls the switching circuit 202 by a mode select signal from the console 151 to supply the image data from the digitizing circuit 201 to either the memory 203 or the buffer circuit 204. Numeral 153 denotes a clock generator which generates a clock signal and supplies it to the CCD's 7 and 7' and the digitizing circuits 101 and 201 under the control of the control circuit 150.

The recording operation of the present apparatus is now explained.

FIG. 6 shows a flow chart of a control program of the present apparatus. This program is pre-stored in a memory ROM of the microcomputer of the control circuit 150.

The double-side recording operation to produce the exact reproduction of the book-type original OB (hereinafter referred to as the first recording mode) is explained with reference to FIGS. 4A–4D.

When an operator depresses the mode select key 151-6 of the console 151 to select the first recording mode, the switching lever 86 is set to the broken line position B shown in FIG. 2. The switching circuit 202 is operated so that the image data from the digitizing circuit 201 is supplied to the memory 203. A quotient N derived by dividing the input number of pages P by two is set in the RAM. The book-type original OB is mounted on the mounting glass 1 as shown in FIG. 4A so that the first opened page is read by the reading unit 10 and the second opened page is read by the reader 20. When the copy start key 151-2 of the console 151 is depressed, the conveyer rollers 56–65 are driven and the number N is decremented by one. The paper feed roller 53 is driven for a time period T1 to feed the record paper 51-1 contained in the paper cassette 52 to the registration rollers 54 and 55. The number of copies C is decremented by one. As the registration rollers 54 and 55 start to rotate at the predetermined timing, the record paper 51-1 is conveyed toward the recording position 87. When the paper sensor S1 detects that a leading edge of the record paper 151-1 has reached the position 87, the optical system starts to be advanced and the reading of the first page of the original OB by the reading unit 10 is started. The read image data is recorded at the position 87 on the first side of the conveyed record paper 51-1 by the head 80. !;hen the recording on the first side of the record paper 51 has been completed, the record paper 51 is guided by the switching lever 86 as shown in FIG. 4D and ejected to the tray 79. When the sensor S2 detects that the record paper 51-1 has reached the position 88, the second page of the original OB is read by the reading unit 20 a predetermined time later than the reading of the first page. The read image data is stored in the first memory 203-1 of the memory 203 which has been set in a write mode, through the switching circuit 202 under the control of the control circuit 150.

When the reading of the original has been completed and the optical sensor activates the back position sensor BP, the advancement of the optical system is stopped and the optical system starts to retract. When the optical system returns to the position to activate the home position sensor HP, the movement of the optical system is stopped. This operation is repeated by a number of times equal to the present number of copies, and when the count C reaches zero the conveyer roller 53 is stopped and the apparatus waits for next depression of the copy start key 151-2.

The page of the book-type original OB is turned over and the opened pages are set as shown in FIG. 4B and the copy start key 151-1 is again depressed. Thus, the reading units 10 and 20 read the third page and the fourth page, respectively, at the predetermined time interval. The image data of the third page of the original OB read by the reading unit 10 is recorded by the head 80 on the first side of the second record paper 51-2 fed from the cassette 52 to the recording position 87. The record paper 51-2 has the image recorded thereon at the position 87 and conveyed toward the position 88. When the second paper sensor S2 detects that the leading edge of the record paper 51-2 has reached the recording position 88, the reading unit 20 starts to read the fourth page of the original OB. When the image data from the reading unit 20 starts to be supplied to the memory 203, the memory 203 stores the sequentially supplied image data in the second memory which is now in the write mode, under the control of the control circuit 150 and sets the first memory 203-1 to the read mode and supplies the stored image data of the second page to the ink jet head 81 through the buffer circuit 204 and the drive circuit 205 in synchronism with the write timing. Thus, the head 81 records the second page of the original OB on the second side of the record paper 51-2 passing through the recording position 88. The record paper 51-2 having the image recorded thereon is guided by the switching lever 86 and ejected to the paper ejection tray 79. In this manner, the second and third pages of the original OB are recorded on the opposite sides of the record paper 51-2. The above operation is repeated by the number of times equal to the preset number of copies and then the conveyer rollers are stopped and the apparatus waits for the next input from the copy start key.

The page of the original OB is turned over and the copy start key 121-2 is depressed so that the fifth and sixth pages of the original OB are read as shown in FIG. 4C. The image of the fifth page of the original OB is recorded on a first side of a third record paper 51-3 by the head 80, and the image of the fourth page stored in the memory 203 is recorded on a second side of the record paper 51-3 by the head 81. The image data of the sixth page read by the read unit 20 is stored in the first memory 203-1 of the memory 203.

By repeating the reading of the original OB and the recording to the record paper in this manner, the record papers 51-1, 51-2, 51-3, . . . having images recorded on opposite sides thereof with the same condition as the front and back pages of the book-type original OB are stacked in the paper ejection tray 79, as shown in FIG. 4D.

When the count N reaches zero, the image data stored in the memory 203 by the final original reading is read out after the optical system which was used in the final original reading has returned to the home position, and recorded on one side of a record paper 51-n by the head 81.

Figure 5B:
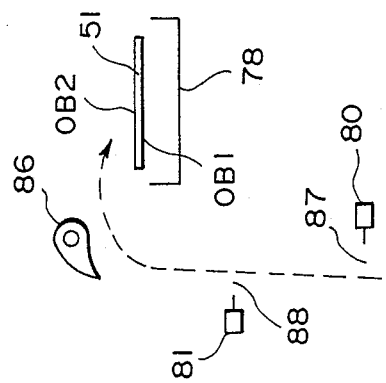
FIGS. 5A and 5B show diagrams for illustrating a second recording mode of the present apparatus, FIG. 6 composed of FIGS. 6A, 6B, 6C and 6D shows a flow chart of a control program of the control unit shown in FIG. 3, and FIGS. 7 and 8 show another embodiment of the record unit.
Figure 5A:
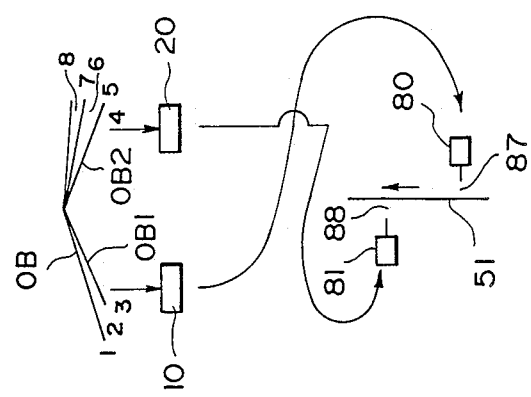
Figure 6D:
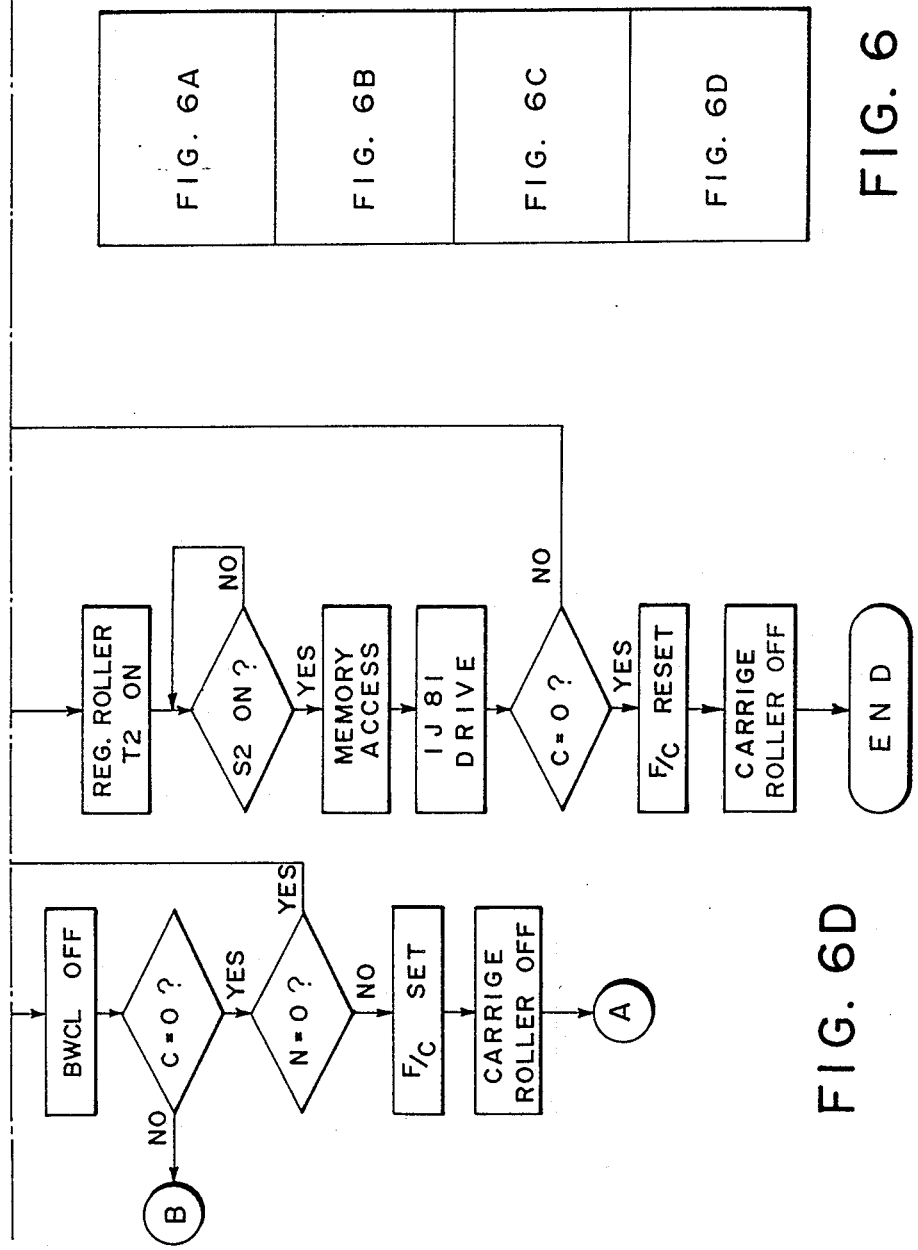
Figure 6A:
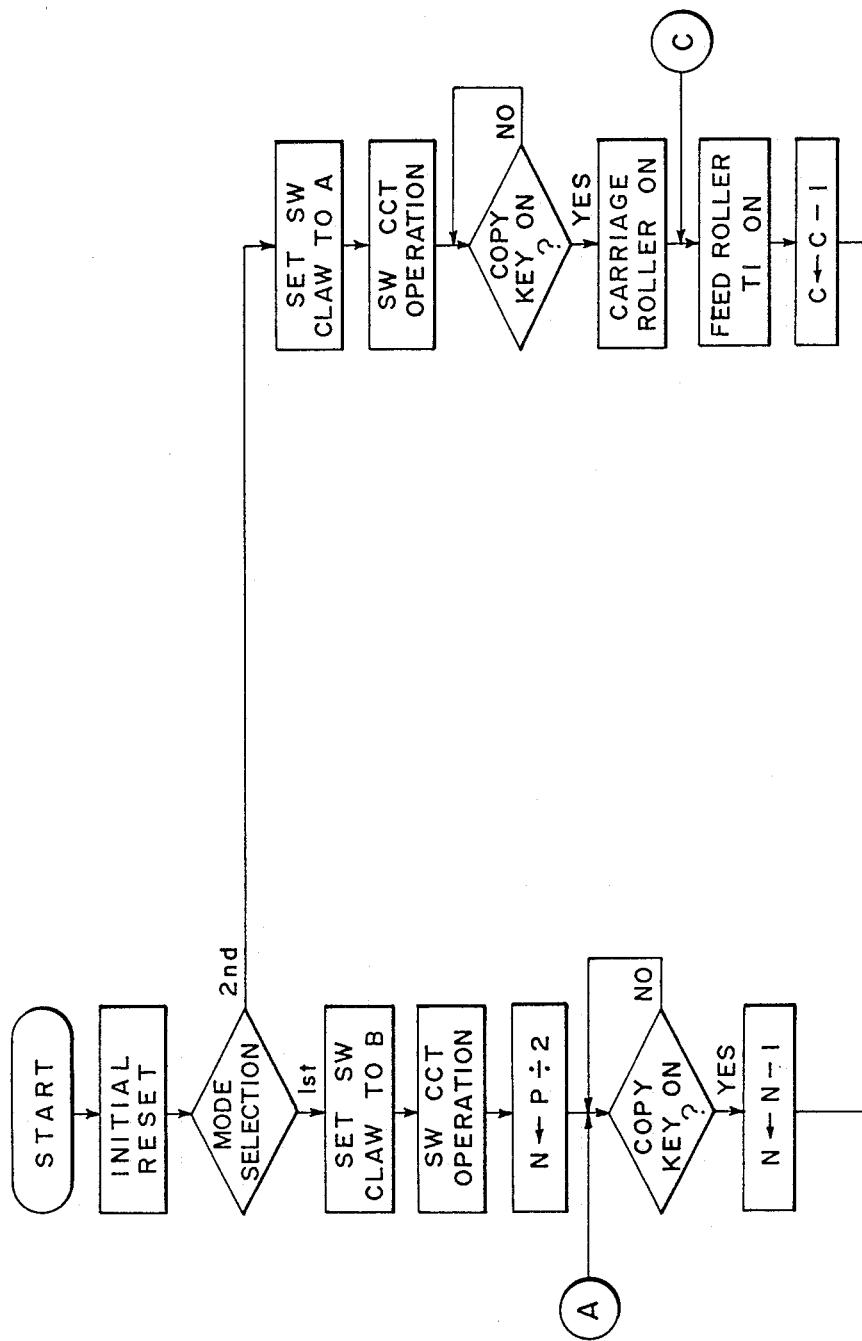
Figure 6B:
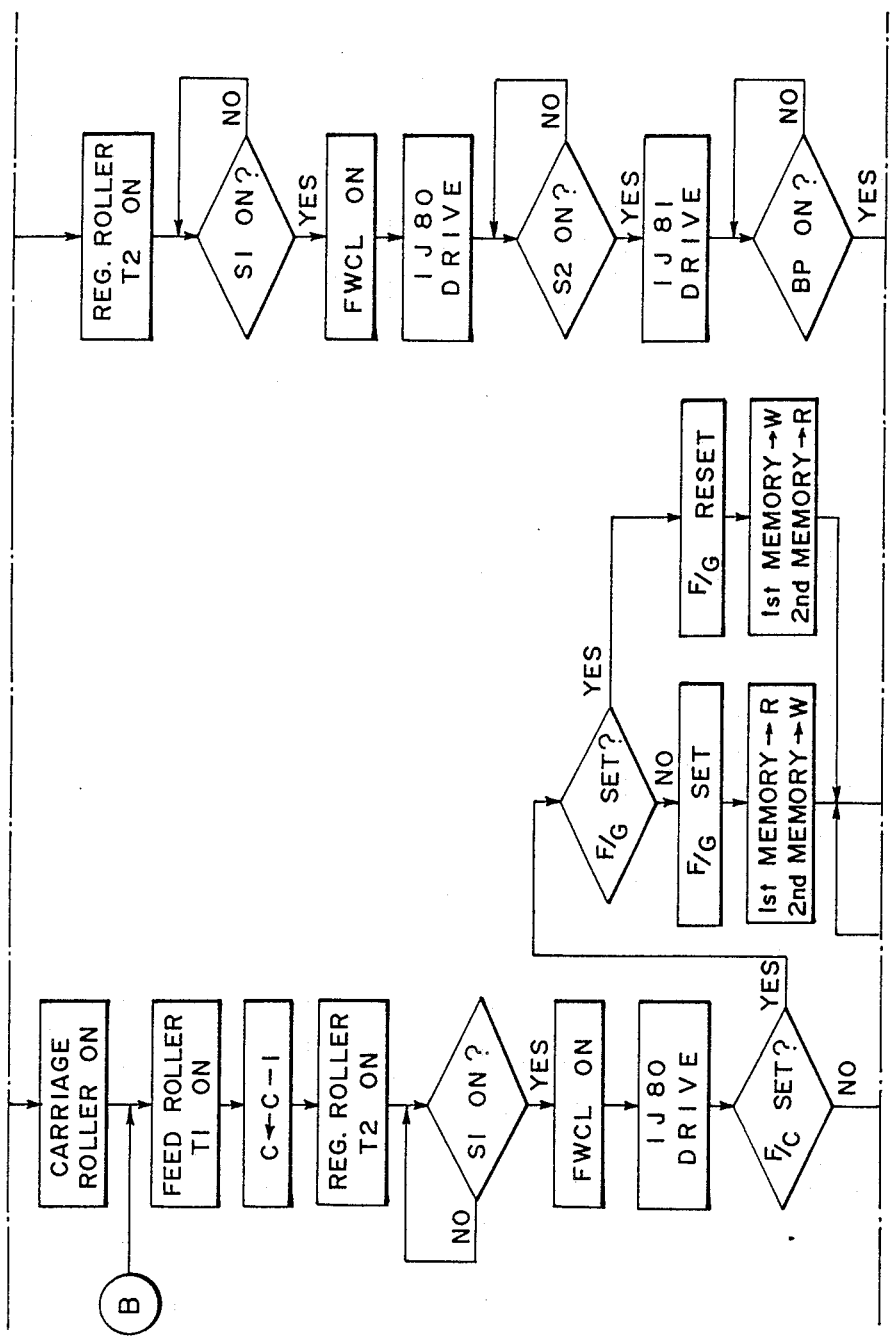
Figure 6C:
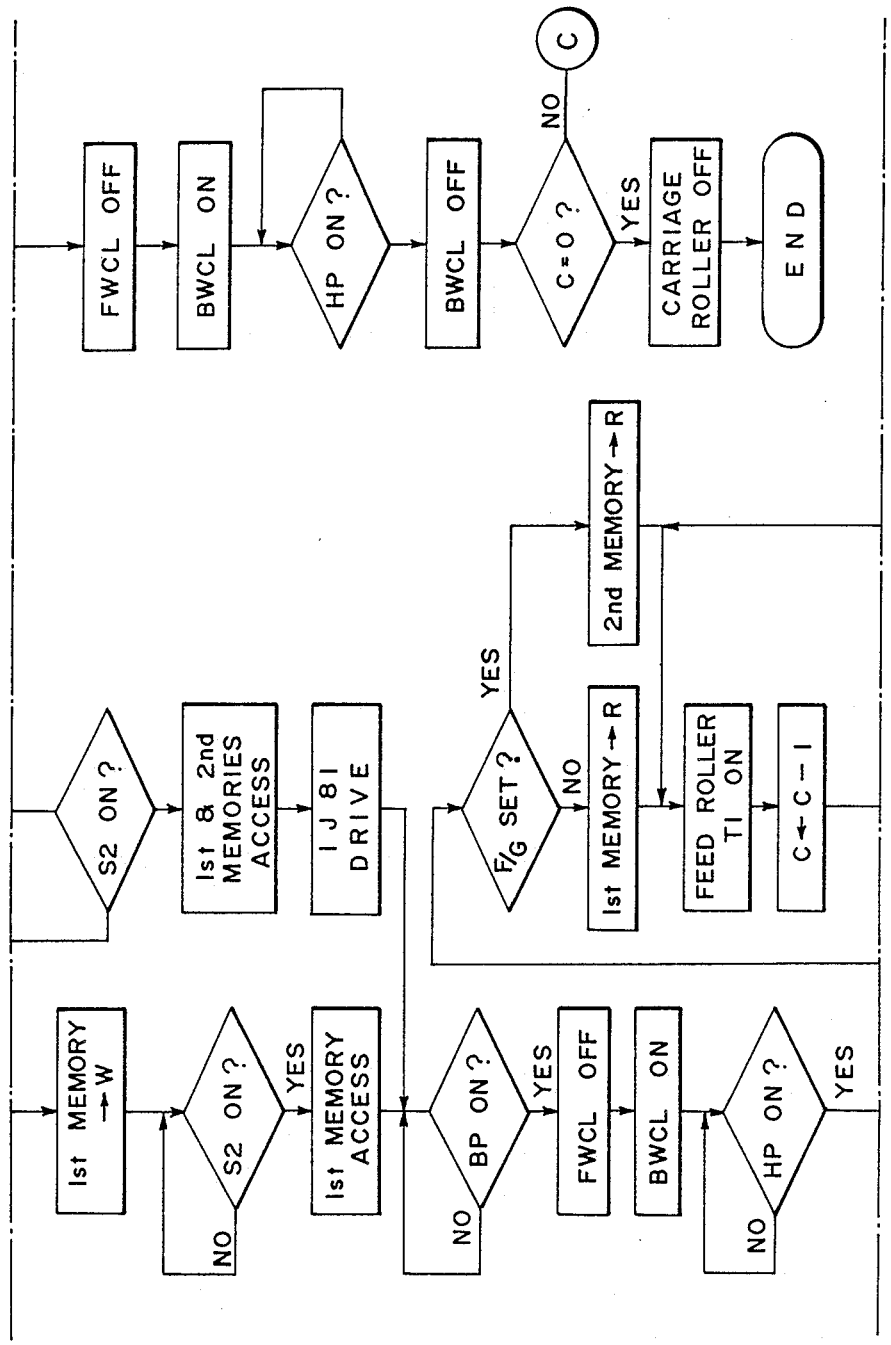

Referring to FIGS. 5A and 5B, the recording operation for recording the two opened pages of the original OB on the opposite sides of the record paper (hereinafter referred to as the second recording mode) is explained. When the mode select key 151-5 of the console 151 is depressed to select the second recording mode, the switching lever 86 is switched to the solid line position A shown in FIG. 2. The switching circuit 202 is activated so that the output from the digitizing circuit 201 bypasses the memory 203 and is supplied to the buffer circuit 204. When the copy start key 151-2 is depressed, the conveyer roller rotates and the paper feed roller 52 is driven to feed the record paper 51 from the cassette 52 to the registration rollers 54 and 55. The record paper 51 is conveyed by the registration rollers 54 and 55 to the recording position 87 at the predetermined timing. When the first sensor S1 detects that the leading edge of the record paper 51 has reached the position 87, the read unit 10 starts to be advanced and the reading of one page OB1 of the original OB is started. The image data from the read unit 10 is supplied to the ink jet head 80 through the buffer circuit 104 and the drive circuit 105 and the image of the one page OB1 of the original OB is recorded on the first side of the record paper 51 by the head 81. When the second sensor S2 detects that the leading edge of the record paper 51 has reached the position 88, the read unit 20 starts to read the other page OB2 of the original OB. The image data from the read unit 20 is supplied to the buffer circuit 204 by the switching circuit 202 and then supplied to the head 81 through the drive circuit 205. The image of the other page OB2 is recorded by the head 81 on the second page of the record paper 51 passing through the position 88. After the recording, the record paper is guided by the switching lever 86 and ejected to the tray 78. The above operation is repeated by the number of times equal to the preset number of copies C.

Figure 7:
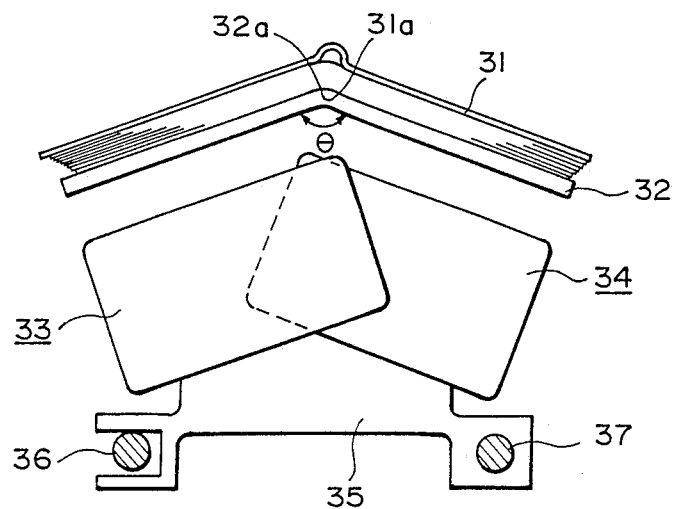
Figure 8:
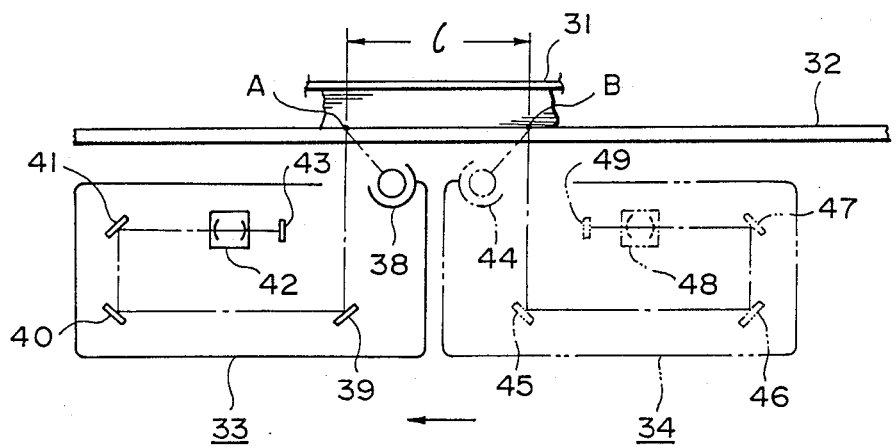

FIGS. 7 and 8 show another embodiment of the book-type original read unit. In FIG. 7, numeral 31 denotes a book-type original, numeral 32 denotes a platen mode of a transparent plate, numerals 33 and 34 denote read units, numeral 35 denotes a read unit mount for assembling the read units 33 and 34 in union, and numerals 36 and 37 denote a sliding shaft for moving the read units 33 and 34 mounted on the mount 35 in parallel to each other along the vertical direction (normal to the plane of drawing in FIG. 7) of the image plane of the original 31. The platen 32 is bent in a mountain shape at a center thereof by a predetermined angle $\theta$ toward the read units 33 and 34, and the read units 33 and 34 are arranged to face the opposite inclined surfaces of the platen 32 so that they are relatively moved in parallel. The angle $\theta$ is selected such that a folding line 31a of the original 31 contacts to an apex 32a of the platen 32 and the original 31 contacts to the surfaces of the platen 32. The angle 0 is selected from 90° to 180° taking the thickness of the original 31, the easiness of the original mounting operation and the prevention of the slip-off of the original 31 into consideration. It is preferable to use a hinge so that the angle $\theta$ is variable. One surface of the platen 32 may be held horizontally. A stopper (not shown) for preventing the slip-off of the original 31 along the inclined surface may be provided on the surface of the platen 32 so that a single-sheet original can be mounted.

FIG. 8 shows a side view of FIG. 7. Numerals 38 and 44 denote bar light sources such as halogen original illumination lamp, numerals 39-41 and 45-47 denote reflection mirrors, numerals 42 and 48 denote focusing lenses and numerals 43 and 49 denote one-dimension image sensors such as CCD line image sensors including plurality of one-dimensionally arranged photosensitive elements. The read positions of the read units 33 and 34 are moved relative to the platen 32 in the image read operation, but the read position (for example A) of the read unit 33 and the read position (for example B) of the read unit 34 are always separated by a distance l, and the distance l is set to be equal to the convey path length between the record heads.

The operation of the read unit of the present embodiment is now explained. When the operator mounts the book-type original 31 on the platen 31 in contact therewith and depresses the copy start key to instruct the image read and record, the read units 33 and 34 are moved horizontally in the direction of the arrow along the slide shafts 36 and 37 while keeping the distance l. The images on the left and right pages of the original 31 are illuminated by the light sources 38 and 44, respectively, and the reflected lights therefrom are focused on the image sensors 43 and 49, respectively, through the mirrors 39-41 and 45-47 and the lenses 42 and 48.

The image sensors 43 and 49 each converts the received reflected light to an electric signal (image signal) of a time sequence corresponding to a radiation light energy. The image signal is electrically processed by the processing circuit shown in FIG. 3 to record the image by the record unit of FIG. 2 on the record paper. When the read position A or B of the read unit 33 or 34 reaches the top or bottom of the original 31 which is the end of the original 31, the read and record operations are terminated.

Since the platen 32 of the read unit is center-folded by the angle $\theta$ and the separate read units 33 and 34 are arranged to face the respective inclined surfaces of the platen 32, the fold line 31a of the original 31 can be contacted to the apex 32a of the platen 32 and the area near the fold line 31a can be exactly read by the read units 33 and 34 which are parallel to the fold line 31a. Accordingly, the image such as characters and graphics near the fold line 31a of the original 31 can be clearly and exactly recorded without distortion.

As described hereinabove, according to the present invention, in recording the image of the book-type original, the two opened pages of the original can be recorded on the opposite sides of one record paper with the front and back side images of the record paper being coincident with the front and back page images of the original. In accordance with the present invention, the switching lever is provided as the convey path switching means so that the convey path is switched depending on the selected recording mode and the record papers are ejected to the separate trays. Thus, the record papers are ejected in the same orientation.

The original need not be of book-type but it may be a sheet original. For example, two sheet originals may be mounted aside to each other.

The record unit of the present apparatus may be, in addition to the full-line ink jet head, a scan-type ink jet printer, an electrophotographic stylus printer, a laser beam printer or a thermal recorder.

Since the recording mode can be selected as required, the image can be recorded depending on the purpose of the user.

The image data may be derived from other than original reading. For example, the data from a television camera, an office computer or a word processor may be used.

What I claim is:

1. An image recording apparatus comprising:
   manually operable means for instructing a start of an image reading operation;
   reading means for reading both images of first and second originals mounted on a common platen in accordance with one instruction by said manually operable means and for generating sets of image data representing the images;
   recording means for recording images on first and second sides of a record medium in response to the image data supplied to said recording means; and
   memory means for storing image data;
   wherein a first set of image data generated by said reading means is supplied to said recording means while a second set of image data generated by said reading means is supplied to said memory means and said recording means records the images based on the first set of image data and a third set of image data stored in said memory means prior to storage therein of the second set of image data.

2. An image recording apparatus according to claim 1 wherein said reading means separately reads images on respective pages of a book-type original mounted at an original mount position.

3. An image recording apparatus according to claim 1 wherein the third set of image data is generated by said reading means in a previous read cycle.

4. An image recording apparatus according to claim 1 wherein the second set of image data, which is supplied to said memory means, is recorded in the next record cycle by said recording means.

5. An image recording apparatus according to claim 1, wherein said reading means simultaneously reads the first and second originals.

6. An image recording apparatus according to claim 1, wherein said memory means stores image data representing at least one page of an original.

7. An image recording apparatus according to claim 1, wherein said reading means photoelectrically reads the image.

8. An image recording apparatus according to claim 1, wherein said recording means having first recording means for recording an image on a first side of a recording medium and second recording means for recording an image on a second side of a recording medium.

9. An image recording apparatus comprising:
   manually operable means for instructing a start of an image scanning operation;
   scanning means for scanning both images of first and second originals mounted on a common platen in accordance with one instruction by said manually operable means and for generating first and second sets of image data representing the first and second original images;
   memory means for storing the second set of image data; and
   recording means for recording an image on a recording medium, wherein said recording means forms an image on a first recording medium based on the first set of image data, which is supplied from said scanning means without passing through said memory means, and then forms an image on a second recording medium, which is different from said first recording medium, based on the second set of image data, which is read from said memory means.

10. An image recording apparatus according to claim 9, wherein said scanning means separately scans images on respective pages of a book-type original mounted on said common platen.

11. An image recording apparatus according to claim 9, wherein said memory means stores image data representing at least one page of the original.

12. An image recording apparatus according to claim 9, wherein said scanning means photoelectrically reads the image.

13. An image recording apparatus according to claim 9, wherein said scanning means simultaneously reads the first and second originals.

14. An image recording apparatus comprising:
    manually operable means for instructing a start of an image scanning operation;
    scanning means for photoelectrically scanning both first and second originals mounted on a common platen in accordance with one instruction by said manually operable means and for generating first and second image data representing the first and second original images;
    memory means for storing image data; and
    recording means for recording first and second images based on the first and second image data generated by said scanning means, wherein said recording means records in a first mode, the first and second images on a front side and a back side of a single recording medium, respectively, based on the first and second image data supplied from said scanning means without passing through said memory means, and said recording means records, in a second mode, the first and second images on different recording medium, respectively based on the first image data supplied from said scanning means without passing through said memory means and the second image data supplied from said scanning means passing through said memory means.

15. An image recording apparatus according to claim 14, wherein said scanning means separately scans images on respective pages of a book-type original mounted on the common platen.

16. An image recording apparatus according to claim 14, wherein the recording medium on which the image has been recorded is provided to different outlets of the apparatus in the first mode and the second mode.

17. An image recording apparatus according to claim 14, further comprising memory means for storing, in the second mode, one of the first and second data, wherein said recording means is operable to record an image based on image data supplied from said memory means.

18. An image recording apparatus according to claim 14, wherein said scanning means simultaneously reads the first and second originals.

19. An image recording apparatus according to claim 14, further comprising selection means for selecting the first mode or second mode.

20. An image recording apparatus according to claim 14, further said memory means stores image data representing at least one page of an original.

21. An image recording apparatus according to claim 14, wherein said memory means stores, in the second mode, the second image data, while the first image is being recorded on a recording medium based on the first image data.

* * * * *

UNITED STATES PATENT AND TRADEMARK OFFICE
CERTIFICATE OF CORRECTION

PATENT NO. : 4,972,271
DATED : November 20, 1990
INVENTOR(S) : Noboru Koumura

It is certified that error appears in the above-identified patent and that said Letters Patent is hereby corrected as shown below:

SHEET 6 OF 10,
    "CARRIGE" (both occurrences), should read --CARRIAGE--.

COLUMN 1,
    Line 40, "booktype original" should read --book-type original--; and
    Line 66, "selects" should read --select--.

COLUMN 3,
    Line 6, "optical position sensor BP" should read --back position sensor BP--;

COLUMN 4,
    Line 56, "denotes" should read --denote--
    Line 62, "read unit" should read --read unit.--.

COLUMN 5,
    Line 54 "!;hen" should read --When--.

COLUMN 8,
    Line 22, "converts" should read --convert--.

UNITED STATES PATENT AND TRADEMARK OFFICE
CERTIFICATE OF CORRECTION

PATENT NO. : 4,972,271

DATED : November 20, 1990

INVENTOR(S) : Noboru Koumura

Page 2 of 2

It is certified that error appears in the above-identified patent and that said Letters Patent is hereby corrected as shown below:

<u>COLUMN 9</u>,
   Line 42, "having" should read --have--.

<u>COLUMN 10</u>,
   Line 59, "further" should read --wherein--.

Signed and Sealed this

Nineteenth Day of January, 1993

*Attest:*

DOUGLAS B. COMER

*Attesting Officer*                 Acting Commissioner of Patents and Trademarks